(12) United States Patent
Miller

(10) Patent No.: US 6,535,341 B1
(45) Date of Patent: Mar. 18, 2003

(54) COLOR LIGHT FILTER AND PROCESS OF MANUFACTURING A COLOR LIGHT FILTER

(76) Inventor: Stanford Miller, 429 Ocean Dr. West, Stamford, CT (US) 06902

( * ) Notice: Subject to any disclaimer, the term of this patent is extended or adjusted under 35 U.S.C. 154(b) by 0 days.

(21) Appl. No.: 10/045,332

(22) Filed: Nov. 7, 2001

(51) Int. Cl.[7] ................................................ G02B 5/22
(52) U.S. Cl. ..................................... 359/885; 359/892
(58) Field of Search ................................ 359/885, 580, 359/361, 892; 430/7, 1

(56) References Cited

U.S. PATENT DOCUMENTS

| | | | | |
|---|---|---|---|---|
| 4,802,745 A | * | 2/1989 | Okada et al. | 252/500 |
| 4,820,619 A | * | 4/1989 | Sanada et al. | 430/145 |
| 5,102,213 A | * | 4/1992 | Lee et al. | 252/582 |
| 5,254,420 A | * | 10/1993 | Otsuka | 359/885 |
| 5,631,107 A | * | 5/1997 | Tarumi et al. | 156/230 |

OTHER PUBLICATIONS rosco, technotes 2a, Color Filters for Entertainment Lighting, two (2) double-sided brochure pages.

* cited by examiner

Primary Examiner—Audrey Chang
Assistant Examiner—Joshua Pritchett
(74) Attorney, Agent, or Firm—R. Gale Rhodes, Jr.

(57) ABSTRACT

A colored light filter for providing a single colored light upon light being transmitted thereto and including a lamination of an at least substantially clear plastic material provided with colored dye and an at least substantially clear thermosetting material. A manufacturing process for laminating an at least substantially clear plastic material provided with colored dye and an at least substantially clear thermosetting material together to provide the color light filter.

17 Claims, 2 Drawing Sheets

COLOR LIGHT FILTER AND PROCESS OF MANUFACTURING A COLOR LIGHT FILTER

BACKGROUND OF THE INVENTION

Color light filters are known to the art for providing a single color of light, or at least a substantially single color of light, upon a plurality of colors of light in the visible light spectrum being transmitted thereto. The color of light provided is, of course, dependent upon the color of the color light filter. Such color light filters are widely used in the entertainment field, such as for example, in stage theaters, outdoor shows and other applications where relatively bright colored light is desired or required. The light for such applications transmitted to the color light filter is typically from what is referred to in the art as a white light source, or reflected from a white light source, and which white light source typically includes at least a portion of the colors of light in the visible light spectrum from violet, through blue, through green, through yellow-orange to red. Some white light sources also produce at least some ultraviolet light and, of course, upon such white light source becoming heated, the white light source radiates and produces at least some infrared light. Light is also used herein and in the appended claims as radiation, electromagnetic radiation, or energy that can affect the human eye.

As is further known to the color light filter art, and referring to FIG. 1A, the typical prior art color light filter includes a transparent, or least substantially transparent, base plastic material 18 which has either or both of its outer surfaces suitably coated with a colored dye 19 in the manner known to the art, or which base material 18 can have a colored dye diffused into either or both of its outer surfaces in a manner known to the art, or and referring to FIG. 1B, the base material 18A can have colored dye 19 dispersed completely through the base material 18A in the manner known to the art. Such prior art plastic base material 18 and 18A may be a clear, or least substantially clear thermoplastic material such as polycarbonate, vinyl, or acetate or may be a thermosetting material such as polyester.

A typical prior art color light filter 10 and its implementation are illustrated diagrammatically in FIG. 1. The prior art color light filter 10 is mounted in a suitable holder (not shown) in front of a light source 12 which may be, for example, the above-noted white light source. Light illustrated by the arrows identified by general numerical designation 14 is transmitted to the color filter 10 from the light source 12 and, for example, upon the color light filter 10 being provided with red dye as described above, the color filter 10 will be a red color light filter, and the red color light filter will allow red color light 16 to pass therethrough but the red dye provided in the red color filter 10 will absorb and block all other colors of light in the visible light spectrum contained in the light 14 from passing through the red color light filter.

Referring again to FIG. 1, the light source 12 is typically operated in the above-noted applications at 500 watts or above and upon the colored dye contained in the base material, as noted above, absorbing the colors of light as noted to prevent their passage through the color filter, heat is produced which can be sufficient to cause the color light filter 10 to degrade, lose its strength or structural integrity and fade. Such loss of strength, structural integrity or weakening can cause the color light filter 10 to wrinkle, or otherwise distort in shape, and fade thereby impairing, if not ultimately destroying, the ability of the color light filter 10 to produce a single color of light. This reduces the useful life of the color light filter 10 causing it to be replaced thereby increasing the cost of providing colored light. Further, in an application such as the above-noted theater application, the color light filter 10 may be located in a relatively inaccessible location in the theater which prevents the color light filter, upon weakening and fading as noted above, from being readily replaced such as during a theater production or performance.

Accordingly, there is a need in the color light filter for a new and improved color light filter having increased strength and an increased ability to withstand heat and maintain its structural integrity thereby providing the light filter with an increased useful life span. There is a further need in the art for a process of manufacturing such new and improved color light filter.

SUMMARY OF THE INVENTION

It is the object of the present invention to satisfy the foregoing needs in the color light filter art.

A color light filter satisfying the foregoing need and embodying the present invention may include a layer of substantially clear plastic material provided with colored dye of a selected color and for allowing light of the selected color to pass therethrough and the colored dye for absorbing and blocking the passage therethrough of light other than the selected color of light in the visible spectrum of light; and a layer of clear thermosetting material laminated to the layer of substantially clear plastic material and for providing the layer of substantially clear plastic material with strength upon the layer of substantially clear plastic material becoming heated due to the colored dye absorbing light of the other colors of light.

The process of the present invention for manufacturing the color light filter of the present invention, and satisfying one of the foregoing needs in the art, may include the steps of providing a substantially clear layer of plastic material provided with a colored dye, providing a layer of clear thermosetting material, and laminating the layer of substantially clear plastic material provided with the colored dye to the layer of clear thermosetting material to provide the color light filter.

DESCRIPTION OF THE PREFERRED EMBODIMENT

Figure 1A:
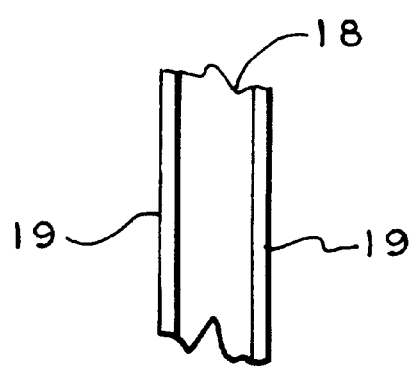
FIG. 1A is a diagrammatical illustration of a prior art color filter including a clear, or substantially clear, base material having colored dye coated or diffused into one or both of its outer surfaces.
Figure 1B:
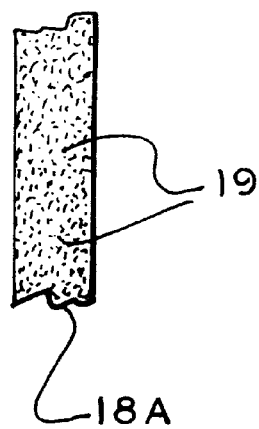
FIG. 1B is a diagrammatical illustration of a prior art color filter including a clear, or substantially clear, plastic base material having a dye dispersed therethrough.
Figure 2:
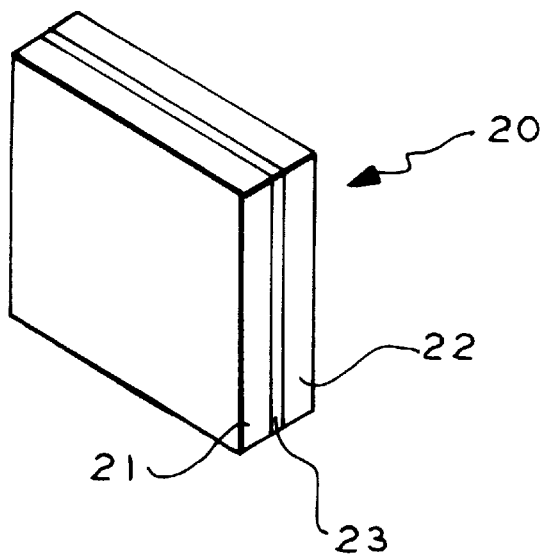
FIG. 2 is a perspective view of a color light filter embodying the present invention.

Referring to FIG. 2, a color light filter embodying the present invention is illustrated and identified by general numerical designation 20. The color light filter 20 may include a layer of material 21 which may be the layer of clear, or at least substantially clear, plastic material 18 shown in FIG. 1A having either or both of its outer surfaces coated with a colored dye, or having a colored dye diffused into either or both of its outer surfaces, or the layer of material 21 may be the clear, or at least substantially clear, layer of plastic material 18A shown in FIG. 1B having a colored dye dispersed therethrough. The clear, or at least substantially clear, plastic material 18, of FIG. 1A, or 18A of FIG. 1B, as noted above, may be either a thermoplastic material such as vinyl, acetate or polycarbonate or may be a thermosetting material such as polyester. The layer of material 21, of FIG. 2, is laminated to a layer of clear, or at least substantially clear, thermosetting material 22 which may be, for example, at least substantially clear polyester. The layers are laminated by suitable heat and pressure, as described in detail below, utilizing a clear, or at least substantially clear, suitable adhesive 23, which may be a pressure-sensitive acrylic adhesive or another suitable clear, or at least substantially clear, heat-stable adhesive.

Figure 3:
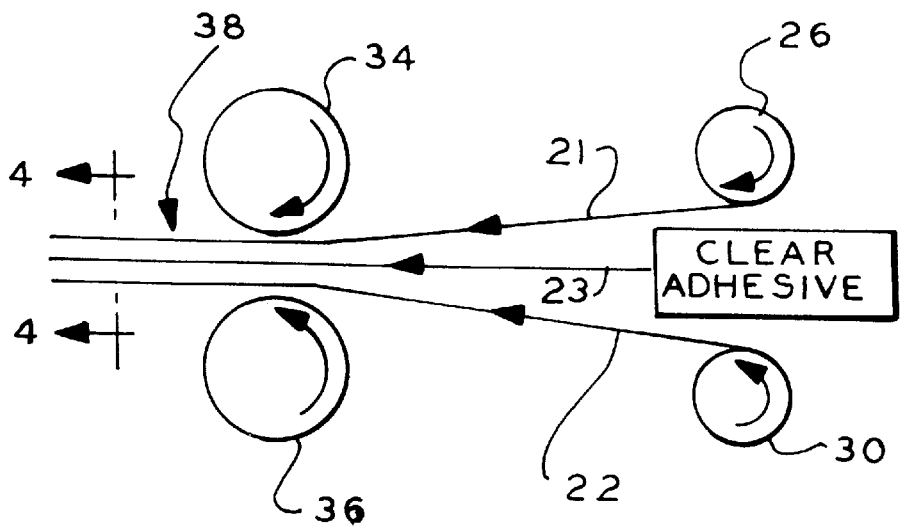
FIG. 3 is a diagrammatic illustration of the manufacturing process of the present invention for manufacturing the color light filter of the present invention.
Figure 4:
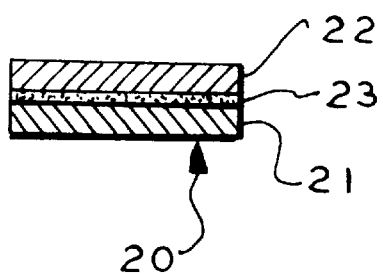
FIG. 4 is a diagrammatical cross-section view of the laminate produced by the manufacturing process of FIG. 3 taken in the direction of the arrows 4—4 in FIG. 3.

Referring now to the process of the present invention for manufacturing the color light filter 20 of FIG. 2, reference is made to FIG. 3. A layer or material 21, as shown in FIG. 2 and as described above, is fed from a suitable supply 26 thereof, a layer of suitable clear thermosetting material 22, such as the above-noted at least substantially clear polyester, is fed from a suitable supply 30 thereof, and clear adhesive, of the types noted above, are fed forwardly as illustrated in FIG. 3 between a pair of opposed and heated pressure rollers 34 and 36. The opposed heat and pressure rollers 34 and 36 apply heat and pressure, for example pressure in the range of from about 2 to about 3 psi and heat at about room temperature or about 78° F., to the layer of material 21, the layer of clear thermosetting material 22 and the intermediate layer of clear adhesive 23 to laminate the material 21 and the clear thermosetting material 22 together as indicated by general numerical designation 38 in FIG. 3.

The lamination 38 may thereafter be cut into suitable color light filters 20, FIG. 2, by suitable cutting machinery of the type known to the art.

Figure 1:
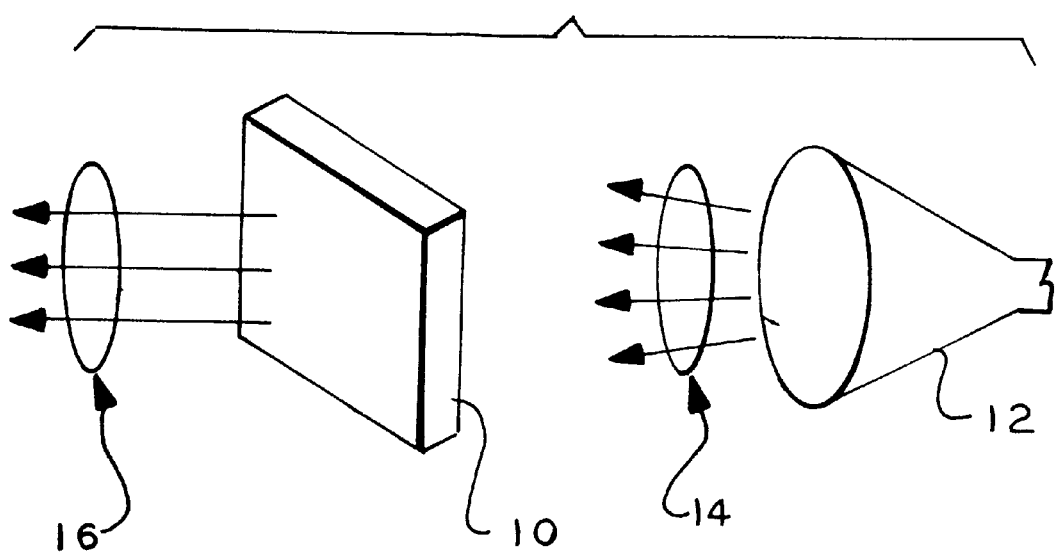
FIG. 1 is a diagrammatical illustration of a typical prior art color light filter and its implementation.

It will now be presumed that the color light filter 20 of the present invention is placed in a suitable holder and resides in place of the prior art color light filter 10 of FIG. 1. It will be understood that the colored dye provided in the material 21, FIG. 2, will be selected to be of a color of one of the colors of light included in the plurality of colors of light 14 shown in FIG. 1. The clear, or at least substantially clear, plastic material comprising the layer of material 21 (FIG. 2), will allow the selected color of light to pass through the color filter 20 of the present invention and, the color dye provided in the material 21 will absorb and thereby block the non-selected colors of light included in the light 14 from passing through the color filter 20 which will produce heat and tend to cause the layer of material 21 (FIG. 2) to lose its strength, weaken, and otherwise distort in shape as noted above, however, since the layer of material 21 is laminated to the layer of thermosetting material 22 (FIG. 2) as taught above with regard to the manufacturing process of FIG. 3, the layer of clear thermosetting material 22, since it is thermosetting and not thermoplastic, will retain its shape and strength and, by being laminated to the layer of material 21, the layer of thermosetting material 22 will cause the layer of material 21 to maintain its shape and structural integrity while it is heated and hence the life span of a color light filter 20 of the present invention will be increased beyond that of the prior art color light filter 10 of FIG. 1.

It will be further understood that in accordance with the further teachings of the present invention, the clear plastic adhesive 23 (FIG. 2) may be provided with suitable ultraviolet inhibitor for inhibiting any ultraviolet light that may be present in the light 14 (FIG. 1) from passing through the clear adhesive 23 which in turn reduces the amount of heat absorbed by the colored dye in the material 21. This reduction in absorbed heat reduces, or at least retards, the loss of strength of the material 21 and further enhances the life span of a color light filter 20 of the present invention.

It will be understood by those skilled in the art that many variations and modifications may be made in the present invention without departing from the spirit and scope thereof.

What is claimed is:

1. A color light filter for providing light of substantially a single color upon light being transmitted therethrough which includes at least a portion of the plurality of colors of light in the visible spectrum, comprising:

a layer of at least substantially clear plastic material provided with colored dye of a selected color of one of said plurality of colors of light and for allowing light of said selected color to pass therethrough, and said colored dye for absorbing light of said other colors of light of said plurality of colors of light to block said other colors of light from passing through said layer of at least substantially clear plastic material; and a layer of at least substantially clear thermosetting material laminated to said layer of at least substantially clear plastic material and for providing said layer of at least substantially clear plastic material with strength upon said layer of at least substantially clear plastic material becoming heated due to said colored dye absorbing said other colors of light of said plurality of colors of light.

2. The color light filter according to claim 1 wherein said layer of at least substantially clear plastic material has opposed surfaces and wherein said colored dye is coated onto one or both of said opposed surfaces.

3. The color light filter according to claim 1 wherein said colored dye is dispersed through said layer of at least substantially clear plastic material.

4. The color light filter according to claim 1 wherein said layer of at least substantially clear plastic material is a layer of at least substantially clear thermoplastic material.

5. The color light filter according to claim 4 wherein said thermoplastic material is chosen from a group consisting of vinyl, acetate and polycarbonate.

6. The color light filter according to claim 1 wherein said layer of at least substantially clear thermosetting material is a layer of at least substantially clear polyester.

7. The color light filter according to claim 1 wherein said color light filter further comprises a layer of clear adhesive between said layer of at least substantially clear plastic material and said layer of at least substantially clear thermosetting material.

8. The color light filter according to claim 7 wherein said layer of clear adhesive material comprises a layer of clear pressure-sensitive acrylic adhesive.

9. The color light filter according to claim 7 wherein said clear adhesive is provided with ultraviolet inhibitors.

10. The process of manufacturing a color light filter comprising steps of:

providing a layer of at least substantially clear plastic material provided with a colored dye;

providing a layer of at least substantially clear thermosetting material; and laminating said layer of at least substantially clear plastic material provided with colored dye to said layer of at least substantially clear thermosetting material for providing said layer of at least substantially clear plastic material provided with a colored dye with strength upon said layer of at least substantially clear plastic material provided with a colored dye becoming heated.

11. The process according to claim 10 wherein said step of providing a layer of at least substantially clear plastic material provided with colored dye is the step of providing a layer of at least substantially clear thermoplastic material provided with colored dye.

12. The process according to claim 11 wherein said step of providing a layer of at least substantially clear plastic thermoplastic material provided with a dye is the step of providing an at least substantially clear layer of thermoplastic material chosen from a group consisting of vinyl, acrylic and polycarbonate provided with colored dye.

13. The process according to claim 10 wherein said step of providing a layer of at least substantially clear plastic material provided with colored dye is the step of providing an at least substantially clear layer of polyester provided with colored dye.

14. The process according to claim 10 wherein said laminating step is the step of laminating said layer of at least substantially clear plastic material provided with colored dye to said layer of at least substantially clear thermosetting material includes the step of adhering said layers of material together with a clear adhesive and applying pressure and heat thereto.

15. The process according to claim 14 wherein said heat is applied at about 78° F.

16. The process according to claim 14 wherein said step of applying pressure is the step of applying pressure at from about 2 to about 3 pounds per square inch.

17. A color light filter, comprising a substantially clear layer of thermoplastic or thermosetting material provided with colored dye; and a substantially clear layer of thermosetting material laminated to said layer of thermoplastic or thermosetting with colored dye material by a substantially clear adhesive for providing said layer of at least substantially clear layer of thermoplastic or thermosetting material with strength upon said layer of at least substantially clear layer of thermoplastic or thermosetting material becoming heated.

\* \* \* \* \*